United States Patent
Togashi

(10) Patent No.: US 6,437,928 B2
(45) Date of Patent: Aug. 20, 2002

(54) RESIN-MOLDED OPTICAL ELEMENT AND METHOD FOR MANUFACTURING THE SAME

(75) Inventor: Masatoshi Togashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 11 days.

(21) Appl. No.: 09/757,284

(22) Filed: Jan. 8, 2001

(30) Foreign Application Priority Data

Jan. 13, 2000 (JP) ........................ 2000-010028

(51) Int. Cl.[7] .............. G02B 7/02; B29D 11/00
(52) U.S. Cl. ............. 359/811; 359/808; 264/1.32; 264/2.7
(58) Field of Search .............. 359/811, 808; 264/1.32, 2.7

(56) References Cited

U.S. PATENT DOCUMENTS 5,716,540 A * 2/1998 Matiacio et al. ............. 249/117
5,905,599 A * 5/1999 Nomura et al. ............. 359/819
5,982,565 A * 11/1999 Nomura et al. ............. 359/818

FOREIGN PATENT DOCUMENTS

| JP | 61258718 A | * 11/1986 | ........... B29C/45/26 |
| JP | 10-274703 | 10/1998 | |
| JP | 20011150487 A | * 6/2001 | ........... B29C/45/26 |

* cited by examiner

Primary Examiner—Georgia Epps
Assistant Examiner—David N. Spector
(74) Attorney, Agent, or Firm—Brinks Hofer Gilson & Lione

(57) ABSTRACT

In an optical element having an optical axis and formed by resin-molding using molds, the position of the optical axis at a lens surface is set at the position of a pinpoint gate serving as an inlet for resin, and a doughnut-shaped light-shielding zone for blocking light is provided in such a manner as to surround a cut portion of the resin at the pinpoint gate.

6 Claims, 5 Drawing Sheets

RESIN-MOLDED OPTICAL ELEMENT AND METHOD FOR MANUFACTURING THE SAME

BACKGROUND OF THE INVENTION

1. Field of the Invention

The present invention relates to an optical element suitably applied to a resin lens and the like which is used in an optical device, and to a method for manufacturing the optical element.

2. Description of the Related Art

Recently, there has been an increasing demand for lenses made of resin which can be manufactured at low cost for use in optical devices, such as an optical pickup device and the like. Such lenses are usually manufactured by resin molding using molds.

FIG. 8 is a plan view showing a conventional lens 50, manufactured by molding, before gates 64 are cut; FIG. 9 is a sectional view taken along the line 9—9 in FIG. 8; and FIG. 10 is an illustration for explaining the state of resin 70 filled in a cavity 65.

The conventional lens 50 is resin-molded using molds 60 and 61, as shown in FIG. 9. The molds 60 and 61 include a sprue 62, which is an injection port for the resin, runners 63 equivalent to passages for the resin, the cavities 65 in which the lenses 50 are molded, and the gates 64 equivalent to inlet ports from the runners 63 to the cavities 65.

Each gate 64 is provided at a position of each cavity 65 corresponding to a part of a side wall surface (outer peripheral surface) of each lens 50, and the resin 70 is filled in each cavity 65 using each gate 64 as an inlet port. That is, as shown in FIG. 10, when the resin 70 is filled in the cavity 65, the resin flows approximately in one direction from the gate 64 toward the sidewall surface of the cavity 65 opposing the gate 64. When the cavity 65 is completely filled with the resin 70, the resin 70 is cooled and the lens 50 is completed.

The lens 50 manufactured as described above, however, produces a strain approximately in one direction (x-direction) along the flow of the resin 70 and as a result, for example, so-called astigmatism is caused in which the focal position of light in the x-direction does not coincide with that in the direction perpendicularly intersecting the x-direction, and the lens has directional properties. For this reason, when the lens 50 is mounted in an optical device, the orientation of the lens 50 around an optical axis must be fixed, for example, after minimizing the astigmatism of the lens 50 when used in an optical system of the optical device. This causes a reduced assembly efficiency.

SUMMARY OF THE INVENTION

Accordingly, it is an object of the present invention to provide an optical element which does not have directional properties around an optical axis, and a method for manufacturing the optical element.

According to an aspect of the present invention, there is provided an optical element having an optical axis, wherein the optical element is formed by resin-molding, the position of the optical axis at a transmission surface or a reflection surface of light is set at the position of a gate serving as an inlet for resin, and a light-shielding zone for blocking the transmission or reflection of light is provided at the position of the gate.

Since the optical element is formed by the resin which is radially filled from the gate formed at the position of the optical axis, that is, filled with rotational symmetry with respect to the optical axis, astigmatism, which occurs in a conventional lens formed by filling resin in one direction, does not occur, and the optical element can be prevented from having directional properties. In addition, when the optical element is mounted in an optical device, the optical element may be fixed with little concern for the position of the optical element around the optical axis, so that assembly efficiency can be increased. Furthermore, when the optical element is, for example, a lens, the diameter of a focussed spot can be reduced using the light-shielding zone without shortening the wavelength of the light.

In the above optical element, the light-shielding zone may preferably be a light-shielding plane formed by a surface rougher than the transmission surface or the reflection surface. With this arrangement, the optical element can be easily constructed at low cost.

In addition, in the above optical element, the light-shielding plane may preferably be formed to protrude from the transmission surface or the reflection surface. With this arrangement, for example, when the resin at the position of the gate is cut after removing the optical element from the molds so as to be aligned with a predetermined position, the cutting position can be set at a position away from the transmission surface or the reflection surface. Therefore, the cutting operation can be performed without scratching the transmission surface or the reflection surface.

Furthermore, the optical element may be a lens, and the light-shielding zone may be used as a light-shielding mask for obtaining a super-resolution effect of the lens. For example, when the lens is applied to an optical pickup device, the diameter of the focussed spot can be reduced using a laser beam emitted from an inexpensive laser diode without shortening the wavelength of the laser beam, and the optical pickup device can be used to write or read of information on a high-density optical. disk.

According to another aspect of the present invention, there is provided a method for manufacturing an optical element having an optical axis by resin-molding using molds, wherein a gate is provided in the molds so as to correspond to the position of the optical axis in a transmission surface or a reflection surface of the optical element, resin is injected from the gate, and a light-shielding zone is provided at a predetermined portion of the optical element corresponding to the position of the gate.

Since the optical element is formed by the resin radially filled from the gate formed at the position of the optical axis, that is, filled with rotational symmetry with respect to the optical axis, an optical element which does not exhibit astigmatism and which does not have directional properties, unlike the conventional lens formed by filling resin in one direction, can be easily manufactured. When the optical element is a lens, for example, a lens capable of reducing the diameter of a focussed spot using the light-shielding zone without shortening the wavelength of light can be easily manufactured.

Furthermore, a roughened surface rougher than the transmission surface or the reflection surface may preferably be formed at the position of the gate in the molds, and the roughened surface may be transferred to the optical element at the position of the gate to form a light-shielding plane serving as the light-shielding zone.

With the above arrangement, only the roughened. surface, which is rougher than the transmission surface or the reflection surface, is formed in the mold at the position corresponding to the light-shielding zone of the optical element, so that the optical element can be easily manufactured at low cost.

Further objects, features, and advantages of the present invention will apparent from the following description of the preferred embodiments with reference to the attached drawings.

DESCRIPTION OF THE PREFERRED EMBODIMENTS

The preferred embodiments of an optical element and a method for manufacturing the optical element will be described with reference to FIGS. 1 to 7.

Figure 1:
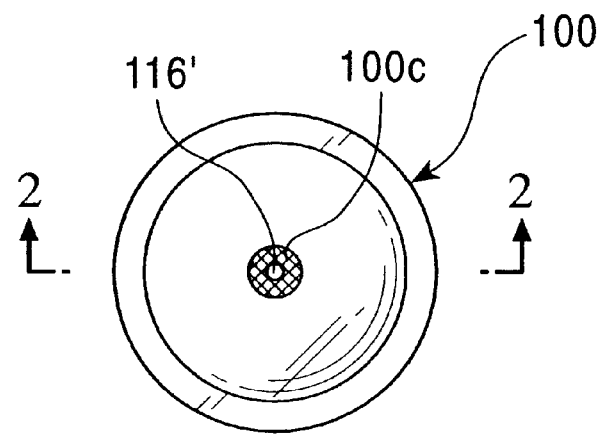
FIG. 1 is a plan view showing a lens according to an embodiment of the present invention.
Figure 2:
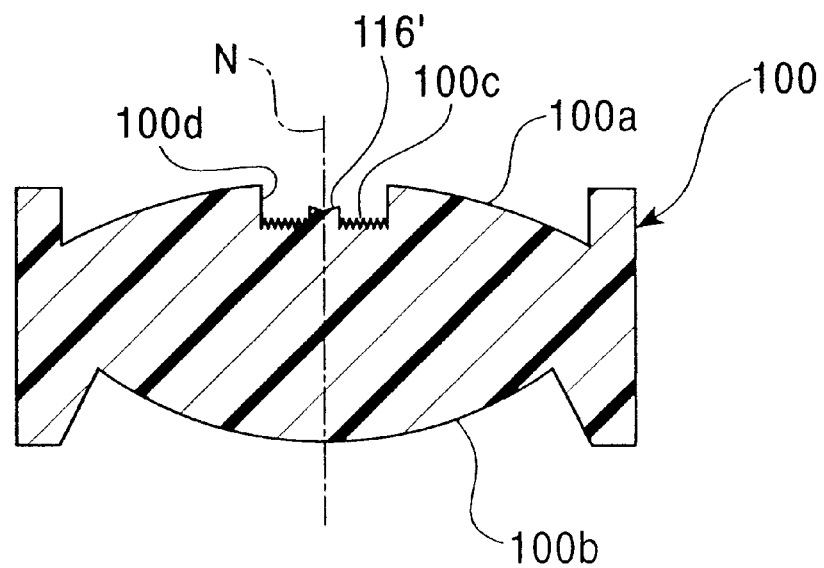
FIG. 2 is a sectional view taken along the line 2—2 in FIG. 1.

As shown in FIGS. 1 and 2, an optical element formed by resin molding, i.e., a lens 100, is a convex lens consisting of two lens surfaces 100a and 100b serving as transmission surfaces. When molding the lens 100, a gate having a circular cross section around an optical axis N of the lens surface 100a, that is, a pinpoint gate 116 (see FIG. 3), is provided at the position of the optical axis N. Reference numeral 116' denotes a cut portion of the resin 120 at the pinpoint gate 116.

In addition, the lens surface 100a is formed with a doughnut-shaped recess 100d that is formed to surround the cut portion 116' and is formed to be approximately coaxial therewith, and a light-shielding zone, i.e., a light-shielding plane 100c is formed on the entire inner bottom surface of the recess 100d. The light-shielding plane 100c is constructed by forming the molded surface thereof to be rougher than that of the lens surfaces 100a and 100b. Thus, the light-shielding plane 100c is constructed so as to block the transmission of light.

A method for manufacturing the lens 100 will now be described.

Figure 3:
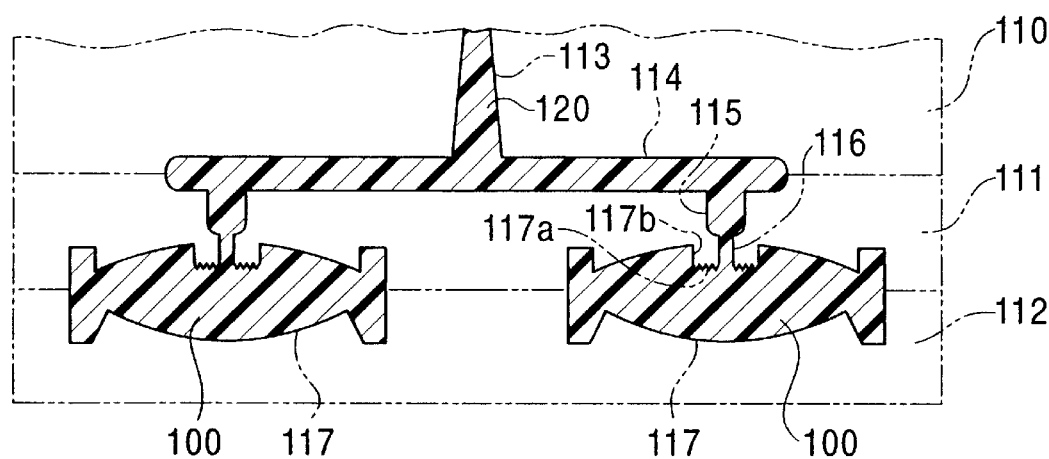
FIG. 3 is a partial sectional view showing molds, and resin injected into the molds 110 to 112.
Figure 4:
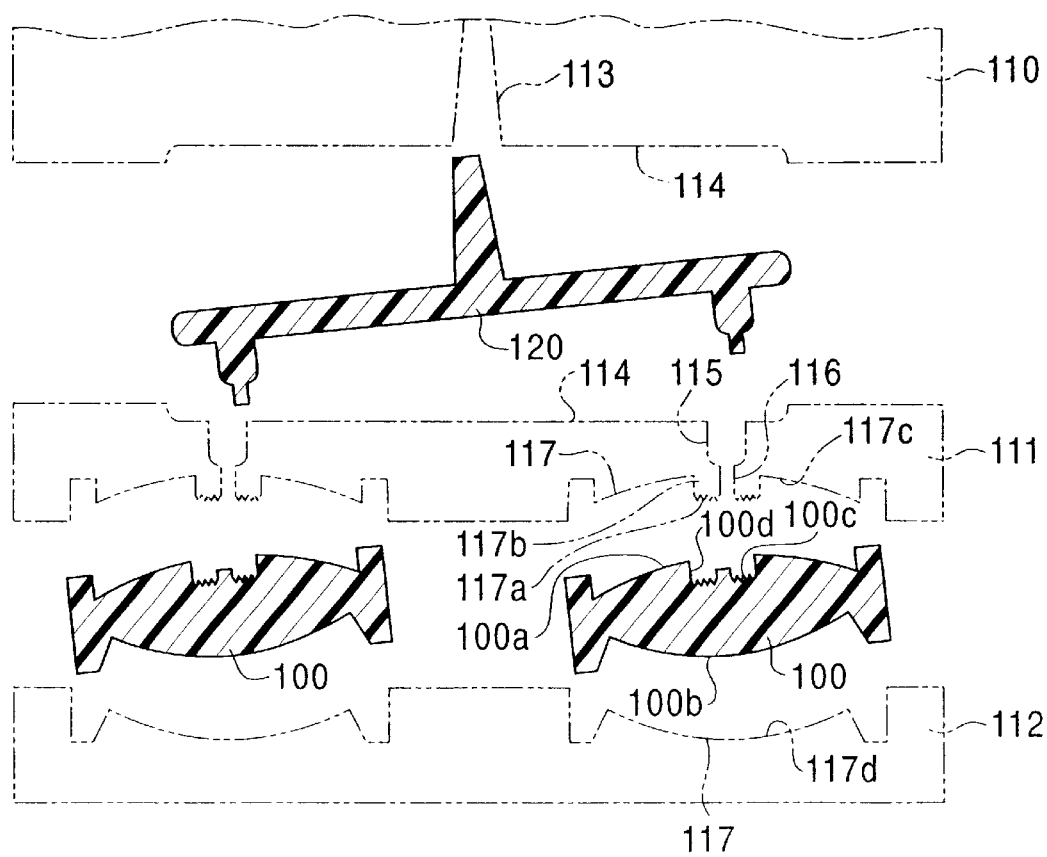
FIG. 4 is an illustration for explaining a state in which the lenses are removed from the molds.

As shown in FIGS. 3 and 4, the lenses 100 are resin molded mainly using molds 110, 111 and 112. The molds 110, 111, and 112 include a sprue 113 serving as an injection port for the resin, runners 114 and 115 equivalent to passages for the resin, cavities 117 in which the lenses 100 are molded, and the pinpoint gates 116 equivalent to inlets from the runner 114 to the cavities 117.

The long sideways runner 114 is formed in matching surfaces of the molds 110 and 111, and the sprue 113 passes through the mold 110 from above so as to be connected to the central part of the runner 114. The mold 111 is formed with the two runners 115 provided downwardly from both ends of the runner 114, and the two pinpoint gates 116 extend to the cavities 117 from the lower ends of the runners 115.

Each of the cavities 117 formed in the lower surface of the mold 111 corresponding to each of the pinpoint gates 116 is provided with a curved surface 117c, a cylindrical protrusion 117b formed to project downward from the curved surface 117c at the center (optical axis N) of the curved surface 117c, and a roughened surface 117a formed on an end surface of the projection 117b for forming the lens surface 100a, the recess 100d, and the light-shielding plane 100c, respectively, of each lens 100. In addition, each of the pinpoint gates 116 is provided so as to pass through the center of the projection 117b.

On the other hand, curved surfaces 117d for forming the lens surfaces 100b of the lenses 100 are formed on the upper surface of the mold 112. The curved surfaces 117c and 117d are finished to fine surfaces by polishing or the like. In addition, the roughened surfaces 117a are finished so as to be sufficiently rough compared with the curved surfaces 117c and 117d.

The lenses 100 are molded by the thus-constructed molds 110 to 112. That is, the resin 120 is injected from the sprue 113 under a predetermined pressure.

Figure 5:
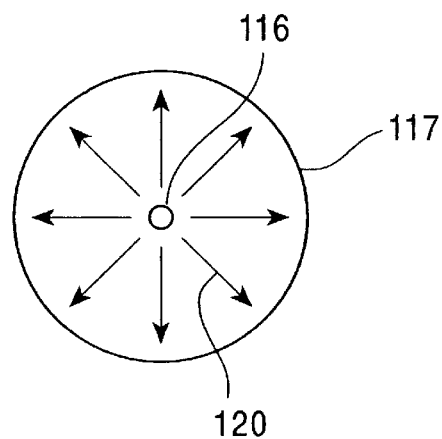
FIG. 5 is an illustration. for explaining the state of the resin filled in a cavity.

As shown in FIG. 5, when the resin 120 is filled in the cavity 117, the resin radially flows to the sidewall surface (inner peripheral surface) of the cavity 117 from the pinpoint gate 116. After the cavity 117 is completely filled with the resin 120 the resin 120 is cooled, and the lens 100 is completed.

As shown in FIG. 4, when the lenses 100 are removed from the molds 110 to 112, the resin 120 filled in the pinpoint gates 116 is cut by cutting means (not shown) provided in the molds 110 to 112. It is preferable that the cut surfaces of the cut portions 116' (see FIG. 2) of the lenses 100 are cut so as to be roughened surfaces capable of blocking light in a manner similar to the light-shielding planes 100c. The resin 120 in the pinpoint gates 116 may be cut by a tensile force generated when the lenses 100 are removed from the mold 111, instead of providing the cutting means in the molds 110 to 112. In this case, it is preferable that the sectional areas of the pinpoint gates 116 are reduced as much as possible so that the tensile force does not have an adverse effect on the properties of the lenses 100.

In each lens 100 Manufactured as described above, the resin 120 radially fills the cavity 117, that is, the cavity 117 is filled with rotational symmetry with respect to the optical axis N as described with reference to FIG. 5, so that astigmatism, which occurs in the conventional lens 50, and the lens 100 does not have directional properties. Therefore, when the lens 100 is mounted in the optical device, the lens 100 may be fixed with little concern for the position of the lens 100 around the optical axis N, whereby the assembly efficiency is increased.

In addition, since the light-shielding plane 100c and the cut portion 116' are provided on the inner bottom surface of the recess 100d, as shown in FIG. 2, they do not protrude from the lens surface 100a, making it possible to arrange other elements closely.

In this embodiment, two lenses 100 are molded by the molds 110 to 112. However, one lens, or three or more lenses may be molded.

The operation of the light-shielding plane 100c provided on the lens 100 will now be described with reference to FIGS. 6A and 6B.

When the lens 100 is used as, for example, an objective lens in an optical pickup device, light focussed by the lens 100, i.e., a laser beam, is illuminated on an information recording surface to perform writing or reading of the information. In this case, the recording density of information in an optical disk can be increased as the diameter of the focussed laser beam (focussed spot) becomes smaller.

As a method for reducing the size of the focussed spot, shortening the wavelength of the laser beam and employment of super-resolution effects are known. The super-resolution effects can be obtained by setting a circular or a rectangular light-shielding mask at the central part (pupil position) of a lens, and the focussed spot formed by the light-shielding mask can be made smaller than that determined by the diffraction limit. On the other hand, the wavelength of the laser beam can be shortened by using a laser diode for emitting a laser beam having a short wavelength. In order to shorten the wavelength of the laser beam emitted from the laser diode, however, advanced technologies must be introduced, resulting in an increase in cost.

Figure 6A:
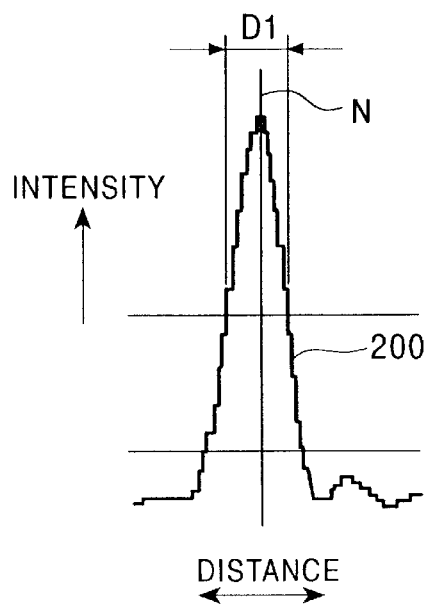
FIG. 6A is an illustration for explaining the state of focussed light when the lens is not provided with a light-shielding plane 100c.
Figure 6B:
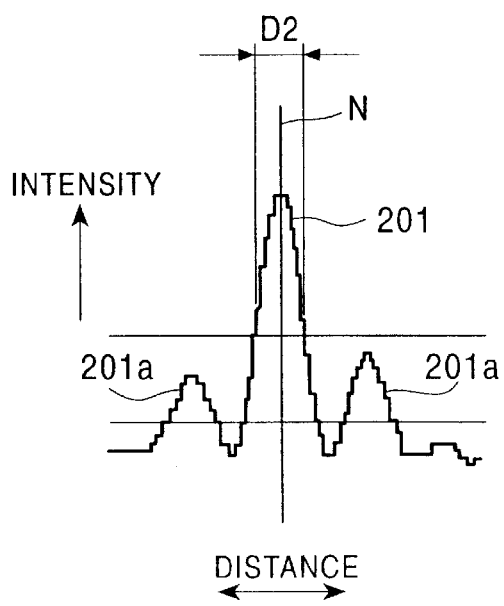
FIG. 6B is an illustration for explaining the state of focussed light when the lens is provided with the light-shielding plane.

FIGS. 6A and 6B qualitatively show intensity distributions of the spot focussed on an optical disk for laser beams having the same wavelength in the case where the light-shielding plane 100c (light-shielding mask) is not provided (FIG. 6A) on the lens 100 (the cut portion 116' is not included), and in the case where the light-shielding plane 100c is provided on the lens 100 (FIG. 6B). The beam diameter D2 (full width half maximum) of a main beam. 201 shown in FIG. 6B is smaller than the beam diameter D1 (full width half maximum) of a main beam 200 shown in FIG. 6A. In this case, secondary laser beams 201a called "side lobes" are generated on both sides of the main beam 201. However, only the main beam 201 can be used for writing/reading of the optical disk, so that the laser beams 201a and 201a do not have an adverse effect on the writing/reading operation.

When the lens 100 is mounted in the optical pickup device as described above, the diameter of the focussed spot can be reduced using an inexpensive laser diode without shortening the wavelength of the laser beam, and the optical pickup device can be used for writing and reading of information on a high-density optical disk. The lens can also be applied to other optical devices.

Another embodiment of the present invention will now be described with reference to FIG. 7.

Figure 7:
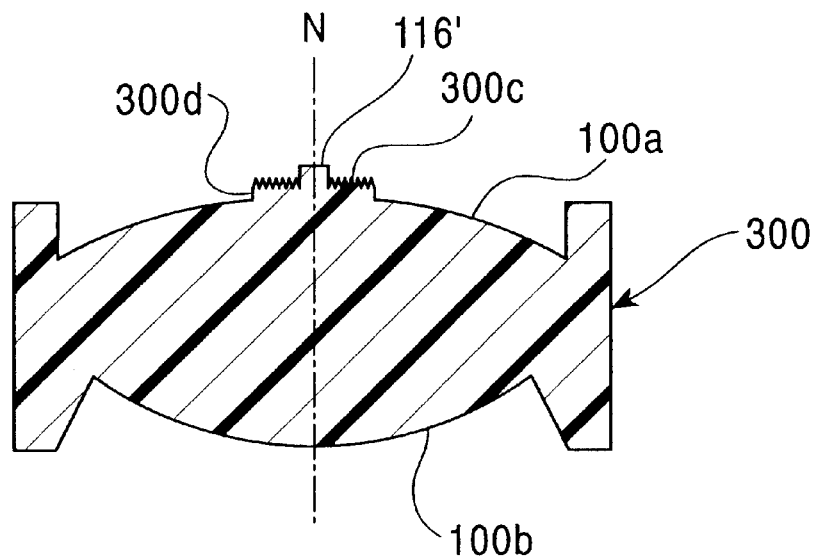
FIG. 7 is a sectional view showing a lens according to another embodiment of the present invention.
Figure 8:
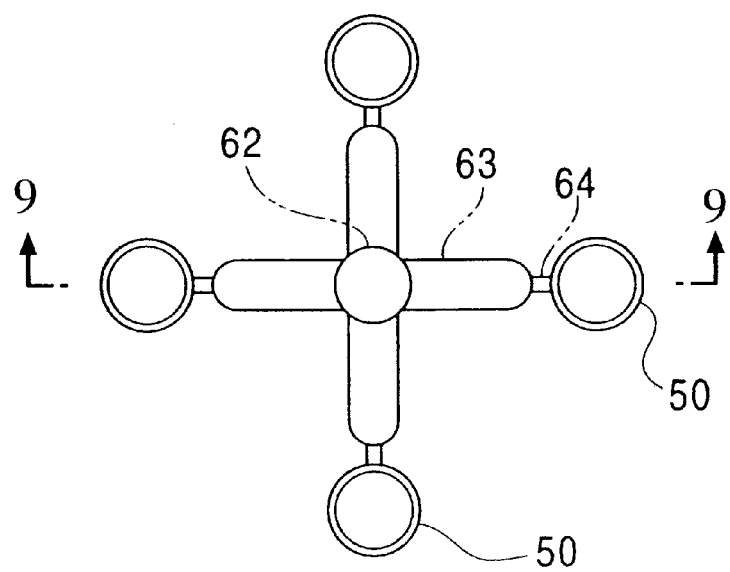
FIG. 8 is a plan view showing a conventional lens manufactured by conventional molding before gates are cut.
Figure 9:
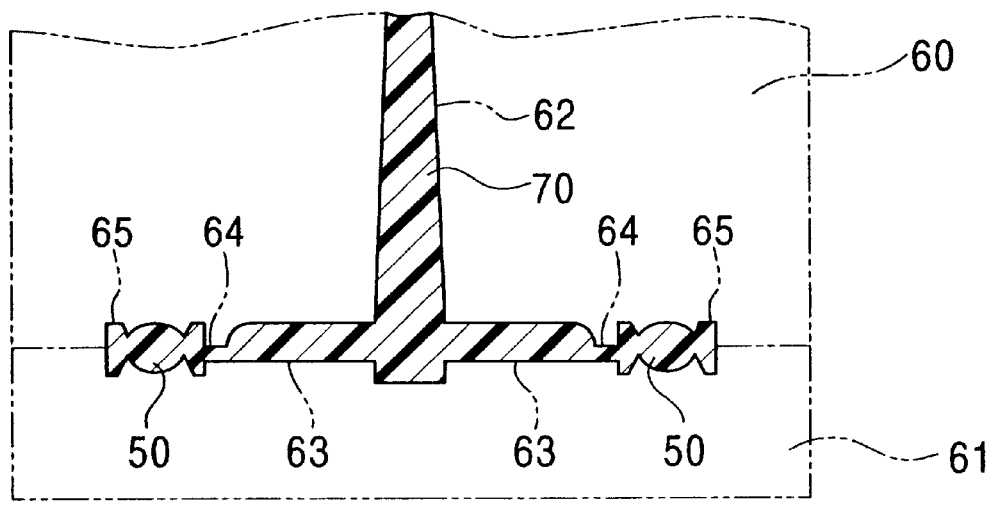
FIG. 9 is a sectional view taken along the line 9—9 in FIG. 8.
Figure 10:
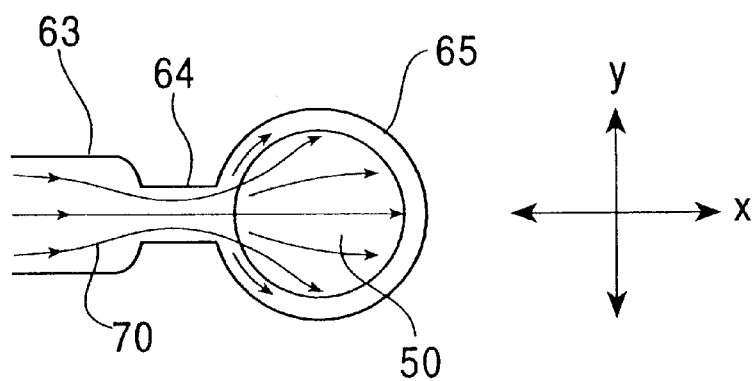
FIG. 10 is an illustration for explaining the state of the resin filled in a cavity.

In FIG. 7, the same portions as the lens 100 of the above-described embodiment are indicated by the same reference numerals. in a lens 300, a pinpoint gate 116 is provided at a position of an optical axis N of a lens surface 100a, as in the case of the above-described embodiment. In this embodiment, however, a light-shielding plane 300c is provided at a position projecting from the lens surface 100a. That is, a columnar protrusion 300d, which is coaxial with the optical axis N of the lens surface 100a and is protruding from the lens surface 100a, is formed, and the light-shielding plane 300c is formed on the upper surface of the protrusion 300d. A cut portion 116' of the pinpoint gate 116 is arranged on the central part of the light-shielding plane 300c.

With the above arrangement, the same advantages as the above-described embodiment can be obtained. In addition, when the cut portion 116' is cut again after the lens 300 is removed from molds so as to be aligned with the position of the light-shielding plane 300c, the cutting position can be set at a position separated above and away from the lens surface 100a. Therefore, the cutting operation can be performed without scratching the lens surface 100a.

When molding the lens 300, the upper surface of the protrusion 300d may be formed into a flat surface, and after the lens 300 is removed from the molds, the upper end surface of the protrusion 300d including the cut portion 116' may be roughened to form the light-shielding plane 300c.

The pinpoint gate 116 may be rectangular in cross section. In addition, the light-shielding planes 100c and 300c may have a rectangular outer shape.

As the optical element of the present invention, an objective lens, a collimator lens, or a cylindrical lens may be used. In addition, a reflecting mirror, a half mirror, or a beam splitter may be used.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical element having an optical axis, wherein the optical element is formed by resin-molding, a position of the optical axis at a transmission surface or a reflection surface of light is set at a position of a gate serving as an inlet for resin, and a light-shielding zone for blocking the transmission or reflection of light is provided at the position of the gate.

2. An optical element according to claim 1, wherein the light-shielding zone is a light-shielding plane formed by a surface rougher than the transmission surface or the reflection surface.

3. An optical element according to claim 2, wherein the light-shielding plane is formed to protrude from the transmission surface or the reflection surface.

4. An optical element according to claim 1, wherein the optical element is a lens, and the light-shielding zone is used as a light-shielding mask for obtaining a super-resolution effect of the lens.

5. A method for manufacturing an optical element having an optical axis by resin-molding using molds, wherein
   a gate is provided in the molds so as to correspond to a position of the optical axis in a transmission surface or a reflection surface of the optical element,
   resin is injected from the gate, and
   a light-shielding zone is provided at a predetermined portion of the optical element corresponding to the position of the gate.

6. A method for manufacturing an optical element according to claim 5, wherein a roughened surface rougher than the transmission surface or the reflection surface is formed at the position of the gate in the molds, and the roughened surface is transferred to the optical element at the position of the gate to form a light-shielding plane serving as the light-shielding zone.

* * * * *